United States Patent
Mawby

(10) Patent No.: US 10,126,738 B2
(45) Date of Patent: Nov. 13, 2018

(54) TIRE UNIFORMITY IMPROVEMENT THROUGH IMPROVED PROCESS HARMONIC RESOLUTION

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventor: William David Mawby, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 400 days.

(21) Appl. No.: 14/892,338

(22) PCT Filed: Jun. 18, 2014

(86) PCT No.: PCT/US2014/042903
§ 371 (c)(1),
(2) Date: Nov. 19, 2015

(87) PCT Pub. No.: WO2014/205058
PCT Pub. Date: Dec. 24, 2014

(65) Prior Publication Data
US 2016/0103448 A1  Apr. 14, 2016

Related U.S. Application Data

(60) Provisional application No. 61/836,261, filed on Jun. 18, 2013.

(51) Int. Cl.
*G01L 5/16* (2006.01)
*G01M 17/02* (2006.01)
*G05B 19/418* (2006.01)

(52) U.S. Cl.
CPC ............ *G05B 19/4188* (2013.01); *G01L 5/16* (2013.01); *G01M 17/02* (2013.01);
(Continued)

(58) Field of Classification Search
CPC ..... G05B 19/4188; G05B 2219/32348; G01M 17/02; G01M 17/024; G01M 17/025;
(Continued)

(56) References Cited

U.S. PATENT DOCUMENTS 6,673,184 B1    1/2004  Brown et al.
8,006,550 B2 *  8/2011  Oblizajek .............. G01M 17/02
                                                      701/82

(Continued)

FOREIGN PATENT DOCUMENTS

WO    WO 2013/039505    3/2013

OTHER PUBLICATIONS

PCT International Search Report for PCT/US2014/042903, dated Sep. 22, 2014—8 pages.

*Primary Examiner* — M. N. Von Buhr
(74) *Attorney, Agent, or Firm* — Dority & Manning, P.A.

(57) ABSTRACT

Methods and systems for improving tire uniformity through identification of characteristics of one or more candidate process effects are provided. The magnitudes of process harmonics associated with one or more candidate process effects can be identified by combining uniformity measurements for a set of tires to achieve an enhanced resolution for a sampling of the process harmonic. The enhanced resolution approach can combine uniformity measurements for a set of a plurality of tires that are slightly offset from one another to generate a composite process harmonic sampling. In particular, the composite process harmonic sampling can be generated by aligning the uniformity measurements for each tire in the set of tires based on the azimuthal location of the maximum magnitude of the process harmonic on each tire. The magnitude of the process harmonic can then be determined using the composite process harmonic sampling.

14 Claims, 8 Drawing Sheets

(52) U.S. Cl.
CPC ......... *G01M 17/024* (2013.01); *G05B 19/418* (2013.01); *G05B 2219/32348* (2013.01)

(58) Field of Classification Search
CPC ..... G01M 17/027; G01M 17/028; G01L 5/16; B29D 30/08; B29D 30/0061; B29D 2030/082; B29D 2030/0066; B29D 2030/0633–2030/0635; G01N 29/44; G01N 29/4409; G01N 29/4472; G01N 29/449

See application file for complete search history.

(56) References Cited

U.S. PATENT DOCUMENTS

| | | | |
|---|---|---|---|
| 8,287,675 B2 * | 10/2012 | Mawby | B29D 30/0662 156/126 |
| 8,544,319 B2 * | 10/2013 | Mawby | B29D 30/0061 702/145 |
| 8,972,035 B2 * | 3/2015 | Hair, Jr. | G01M 17/024 425/58.1 |
| 8,978,458 B2 * | 3/2015 | Mawby | G01M 17/02 73/146 |
| 9,645,052 B2 * | 5/2017 | Mawby | G01M 17/02 |
| 9,823,153 B2 * | 11/2017 | Mawby | G01M 1/12 |
| 2002/0177964 A1 | 11/2002 | Shteinhauz | |
| 2010/0257925 A1 * | 10/2010 | Oblizajek | G01M 17/02 73/146 |
| 2011/0114251 A1 | 5/2011 | Mawby et al. | |
| 2011/0246128 A1 | 10/2011 | Nicholson et al. | |
| 2012/0035757 A1 | 2/2012 | Mawby et al. | |
| 2012/0095587 A1 | 4/2012 | Hair et al. | |
| 2013/0090879 A1 * | 4/2013 | Estor | G01M 17/02 702/97 |
| 2013/0098148 A1 | 4/2013 | Mawby | |
| 2013/0253686 A1 * | 9/2013 | Flament | G01M 17/02 700/117 |

\* cited by examiner

TIRE UNIFORMITY IMPROVEMENT THROUGH IMPROVED PROCESS HARMONIC RESOLUTION

FIELD

The present invention relates to tire uniformity and more particularly to improving the uniformity of tires by estimating characteristics of process harmonics.

BACKGROUND

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

A measured uniformity waveform for a tire can result from manufacturing effects that have both tire effects and process effects. Examples of tire effects include effects due to tire material components (e.g., the product start point or joint overlap location of one or more of casing textile plies, belt plies, bead rings, inner liner, tread and other rubber layers of the tires), manufacturing techniques (e.g., the relative location in which a green tire is introduced on a building drum, placed into a mold or curing press, and the like), and/or controllable conditions used in the tire construction process (e.g., the temperature and pressure at which green tires are subjected during the curing process or other manufacturing steps.) Examples of process effects may arise from such manufacturing conditions as a roller influence, extruder surge, fluctuation in a process condition (e.g., temperature, pressure, speed, etc.) and others.

The impact of tire effects and process effects within a measured uniformity waveform are respectively represented by "tire harmonic" or "process harmonic" components of the composite uniformity waveform. A tire harmonic component has a period that fits an integer number of times within the tire circumference. A process harmonic component has a period that does not fit an integer number of times within the tire circumference.

An example known technique for estimating the magnitude of process harmonic components (i.e. process harmonic magnitudes) involves estimating process harmonic magnitudes for one or more candidate process effects for each tire using a regression analysis. The process harmonic magnitudes for each tire are then averaged to provide an estimate of the process harmonic magnitudes associated with each candidate process effect. There can be practical limits for this technique based on the discrimination of different process harmonics when multiple process effects are identified as candidates for analysis, particularly when the rates of introduction of the candidate process effects are close together. These limits can result at least in part from the sampling resolution of uniformity measurements (e.g. 128 points for each tire) performed for each tire. In particular, it can be difficult to separate candidate process effects having rates of introduction that are spaced more closely than the sampling resolution of the measurement points on the tire allow.

In addition, a process harmonic will typically have a peak (e.g. a maximum magnitude) located at different points in different tires. In other words, the peak of the process harmonic will shift from tire to tire. This can result in the peak of the process effect being located between two discrete measurement points on the tire as opposed to exactly co-located with any observed measurement point. The measurement points do not naturally sample the same points of the process effect when multiple tires are considered.

Thus, a need exists for improving the sampling resolution of uniformity data for estimation of process harmonic magnitudes. A system and method that can increase the sampling resolution of the uniformity data without requiring stacking of tires would be particularly useful.

SUMMARY

Aspects and advantages of the invention will be set forth in part in the following description, or may be apparent from the description, or may be learned through practice of the invention.

One example aspect of the present disclosure is directed to a method of improving the uniformity of a tire. The method includes identifying at least one candidate process effect and obtaining uniformity measurements of a uniformity parameter for each tire in a set of a plurality of tires. The uniformity measurements for each tire are obtained for a plurality of points about the tire. The uniformity measurements contain a process harmonic associated with the at least one candidate process effect. The method further includes aligning the uniformity measurements for the set of tires based at least in part on an azimuthal location of a maximum magnitude of the process harmonic on each tire in the set of tires to construct a composite process harmonic sampling. The method further includes estimating, with the computing device, a magnitude of the process harmonic from the composite process harmonic sampling. The method further includes modifying tire manufacture based on the magnitude of the process harmonic.

In a particular implementation of this example aspect of the present disclosure, the uniformity measurements for each tire are obtained for the plurality of points about the tire at a first sampling resolution. The composite process harmonic sampling is associated with a second sampling resolution. The second sampling resolution is greater than the first sampling resolution.

Another example aspect of the present disclosure is directed to a system for improving the uniformity of tires. The system includes a uniformity measurement machine configured to measure a uniformity waveform for each tire in a plurality of tires. The uniformity waveform for each tire includes a plurality of uniformity measurements of a uniformity parameter for a plurality of measurement points about the tire. The system further includes one or more computing devices coupled to the measurement machine. The one or more computing devices can include one or more processors and at least one memory. The memory can store computer-readable instructions that when executed by the one or more processors cause the one or more processors to perform operations. The operations include one or more aspects of any of the methods of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 plots data points along the abscissa and magnitude of the process harmonic along the ordinate.

FIG. 4 plots data points along the abscissa and magnitude of the process harmonic along the ordinate.

FIGS. 5 and 6 plot data points along the abscissa and magnitude of the process harmonic along the ordinate.

DETAILED DESCRIPTION

Figure 1:
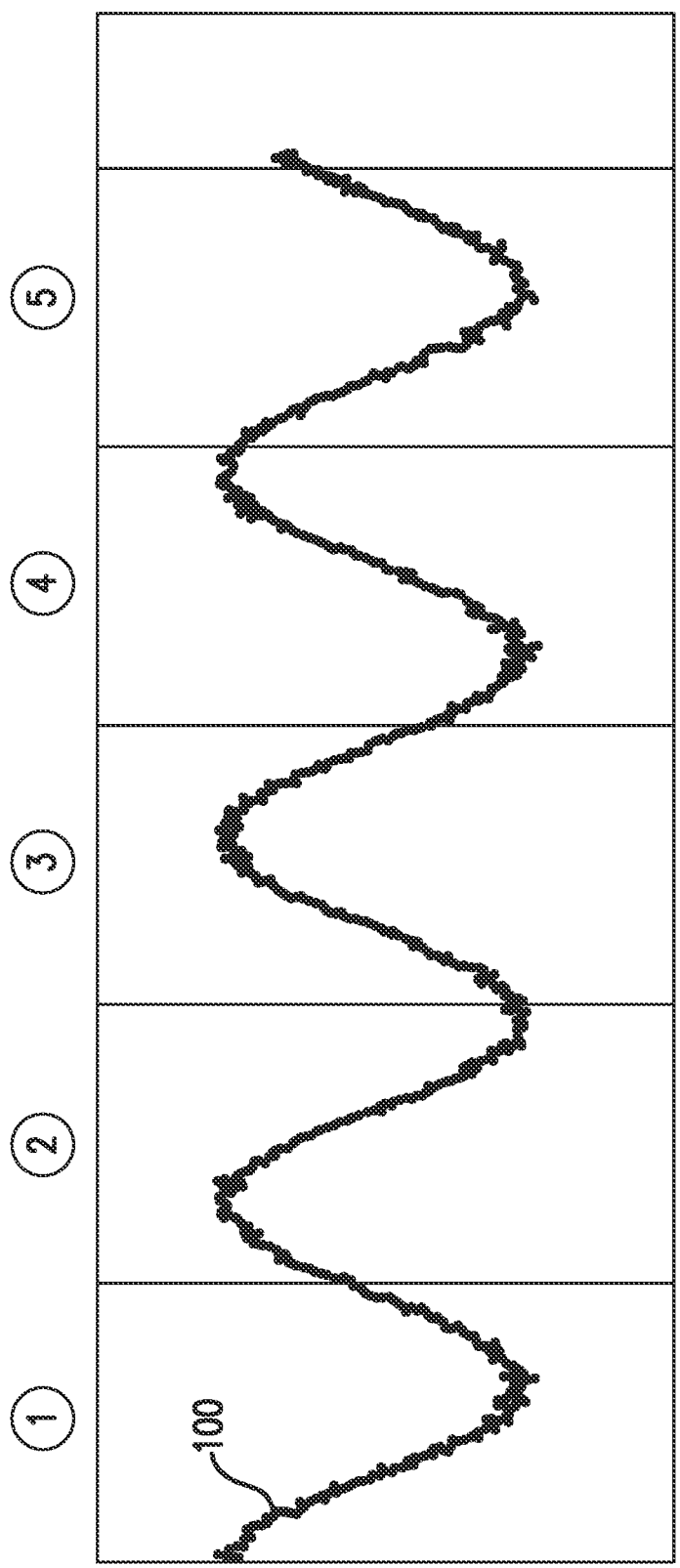
FIG. 1 depicts an example process harmonic manifested across five tires.

It is to be understood by one of ordinary skill in the art that the present discussion is a description of example embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Example aspects of the present disclosure are directed to methods and systems for improving tire uniformity through identification of characteristics of one or more candidate process effects. In analyzing tire uniformity, a variety of different uniformity parameters can be measured for a plurality of tires. The obtained uniformity measurements generally correspond to a uniformity waveform representative of uniformity measurements at a plurality of data points (e.g. 128 points) about the circumference of the tire. The uniformity waveform can be decomposed, for instance using a Fourier analysis, into many respective Fourier harmonics.

Tires, even when manufactured under like conditions, can be subject to dynamic manufacturing effects in two primary ways. In a first case, the periods of the manufacturing effects coincide with the tire circumference. These effects are referred to as tire effects because they are associated with the tire circumference. Tire effects can generally be composed of various tire harmonics that have a period that fits an integer number of times within the circumference of the tire. Typical tire effects can be attributable to tread joint width, out-of-roundness of the building drums, press effects, and other effects.

In a second case, the periods of the manufacturing effects do not coincide with the tire circumference. These effects are referred to as process effects because they are related to process elements rather than tire circumference. Process effects can generally be composed of process harmonics that have a period that does not fit an integer number of times within the circumference of the tire. Typical process effects can be caused, for instance, in the preparation of a semi-finished product (e.g. a tread band), by thickness variations due to the extruder control system or by rollers that can deform the shape of softer products.

A process effect can be expressed or identified in terms of various parameters, including but not limited to the rate (e.g. frequency or period) of introduction relative to the dimensions of the tire (e.g., tire circumference, radius, diameter, discrete number of data points around the tire or the like). The rate of introduction can also be expressed as a harmonic number (e.g. 1.25, 0.8, etc.) The harmonic number can be related to the frequency ($\omega$) of the candidate process harmonic by the following formula: $2\pi h/N$, where h is the harmonic number and N is the number of data points (e.g. 128) measured around the periphery of a tire when obtaining a uniformity measurement. Frequency ($\omega$) can be quantified as Radians per data point measured around the tire. When considering a total number of p candidate process effects, the rate of introduction of each process effect can be defined in terms of its respective harmonic number $h_k$ and/or frequency of introduction $\omega_k$.

According to example aspects of the present disclosure, the magnitudes of process harmonics associated with one or more candidate process effects can be identified by combining uniformity measurements for a set of tires to achieve an enhanced resolution for a sampling of the process harmonic. In particular, this enhanced resolution approach can combine uniformity measurements for a set of a plurality of tires that are slightly offset from one another to generate a composite process harmonic sampling. The composite process harmonic sampling can have a greater sampling resolution than the resolution of the uniformity measurements for each tire.

Similarly, the resolution of the process harmonics can be far finer than the resolution which can be achieved for the tire harmonics on a typical uniformity machine.

In one aspect, the uniformity measurements can be combined for the set of tires based on the azimuthal location of the maximum magnitude of the process harmonic on each tire in the set of tires. More particularly, because the periods of process effects do not coincide with tire circumference, the azimuthal location of the maximum magnitude of the process harmonic will shift from tire to tire. For instance, FIG. 1 depicts an example uniformity waveform representing a process harmonic 100 manifested across five different tires. As shown, the peak of the process harmonic 100 is located at a different azimuthal location for each of the five tires.

Often, the sampling resolution of the uniformity measurements (e.g. 128 data points about the tire) does not naturally sample the same points of the process harmonic. In particular, the azimuthal location of the maximum magnitude of the process effect for a given tire will not necessarily correspond exactly to the location of a measured data point for the tire. For example, a process effect with a harmonic number of 0.81 can have a period corresponding to 1.23 times the number of data points N about the tire circumference. In the example of 128 data points, the process effect can have a period associated with 157.44 data points. The process effect can have a maximum magnitude at an azimuthal location associated with a first data point (e.g. data point 1) in a first tire. The maximum magnitude of the same process effect will be located at point 1+157.44−128=30.44 in the second tire. The maximum magnitude of the same process effect will be located at point 1+2*157.44−2*128=59.88 in the third tire. As demonstrated by the above example, the azimuthal location of the maximum magnitude of the process effect in the second tire and in the third tire are not exactly co-located with one of the 128 measured data points about the tire. Rather, the peak of the process effect is located between the measured data points.

According to particular aspects of the present disclosure, a composite process harmonic sampling can be generated by aligning the uniformity measurements for each tire in the set of tires based on the azimuthal location of the maximum magnitude of the process harmonic on each tire. In one embodiment, the uniformity measurements are aligned to construct the composite process harmonic sampling in the waveform domain. In particular, rectangular coefficients for sine and cosine terms modeling the process harmonic can be determined from the uniformity measurements using, for instance, a regression analysis or a programming analysis. A phase angle for each tire can be determined based on the rectangular coefficients. A point shift can be determined for each tire based on the determined phase angle. The uniformity measurements can then be re-indexed based on the point shift determined for the tire. As a result of the error in determining the phase angle of each tire in the set of tires using, for instance, a regression or programming analysis, the re-indexed uniformity measurements for each tire in the set of tires will be slightly offset from one another. The re-indexed uniformity measurements can be combined to generate a composite process harmonic sampling having a sampling resolution that is greater than the sampling resolution of the measured data points about the tire. The magnitude of the process harmonic can then be determined using the composite process harmonic sampling.

In another embodiment, the uniformity measurements can be aligned to construct the process harmonic sampling in the Fourier domain. For instance, Fourier coefficients can be determined for selected Fourier harmonics of the process harmonic for each tire and a phase shift can be estimated from the Fourier coefficients for each tire. The phase shift can be applied to the Fourier coefficients for each tire to obtain adjusted Fourier coefficients. The adjusted Fourier coefficients can be combined and used to estimate the process harmonic magnitude. For instance, baseline Fourier coefficients associated with the candidate process effect can be obtained. The magnitude of the process harmonic can be estimated using the adjusted Fourier coefficients and the baseline Fourier coefficients using a regression analysis or a programming analysis.

The enhanced resolution approach according to aspects of the present disclosure can increase the precision of process harmonic magnitude estimates. The increased sampling resolution of the composite process harmonic sampling can provide for the discrimination of process harmonics associated with candidate process effects having close rates of introductions (e.g. close harmonic numbers). In addition, analysis of a composite process harmonic sampling for all tires in the set of tires forces the magnitude of the process harmonic to be the same for each tire, which reduce the effects of tire to tire variability in the estimation process. Finally, there is a large practical benefit stemming from the fact that stacking of the tires is not required (i.e. the plurality of tires in the set of tires do not have to be manufactured in sequential order) to perform the analysis. As a result, many more tires (such as up to 90% more tires) can be used in the analysis more easily.

Example Method for Improving the Uniformity of a Tire

Figure 2:
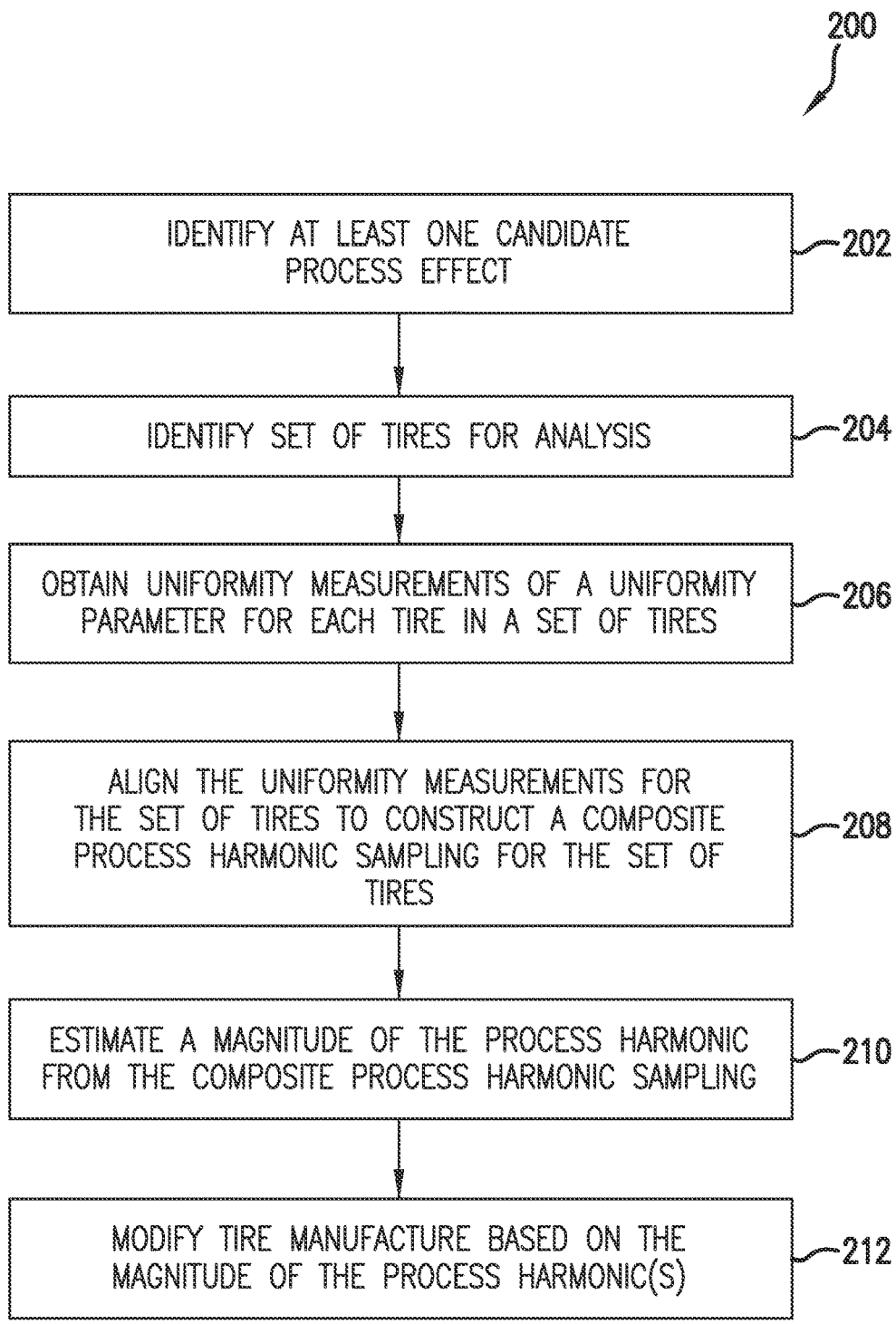
FIG. 2 depicts a flow diagram of an example method for improving the uniformity of a tire according to an example embodiment of the present disclosure.

FIG. 2 depicts a flow diagram of an example method (200) for improving the uniformity of a tire according to an example embodiment of the present disclosure. FIG. 2 depicts steps performed in a particular order for purposes of illustration and discussion. Those of ordinary skill in the art, using the disclosures provided herein, will understand that the various steps of any of the methods disclosed herein can be omitted, adapted, expanded, and/or rearranged in various ways.

At (202), the method includes identifying at least one candidate process effect. A single process effect or multiple process effects can be targeted as candidate process effects for analysis. The at least one candidate process effect can be expressed or identified in terms of various parameters, including but not limited to the frequency or period of introduction relative to the dimensions of the tire. For instance, the candidate process effect can be expressed as a harmonic number (e.g. 0.75, 1.25, etc.).

The candidate process effect(s) can be known process effects identified based on certain known features of the manufacturing process, or the candidate process effects can be unknown. For instance, if the physical process sources are known, it can be possible to identify the candidate process effect(s) from certain aspects and/or conditions of the manufacturing process.

If the candidate process effects are unknown, the candidate process effects can be identified using a variety of search techniques. One example search technique can involve specifying a series of candidate process effects in stepped increments over a range of candidate process effects. (e.g. 0.2, 0.3, 0.4 . . . 1.5, etc.). A regression/programming analysis can identify process effects in the range of candidate process effects by solving for coefficients associated with each incremental candidate process effect in the range.

Process effects associated with non-zero coefficients can be determined to contribute to the overall uniformity of the tire. Other suitable techniques can be used to identify candidate process effects without deviating from the scope of the present disclosure. For instance, Bayesian spectral analysis techniques can be applied to a measured uniformity waveform to determine harmonic numbers for a selected number of candidate process effects. Such example identification techniques are disclosed in U.S. Patent Application Publication No. 2013/0098148, which is incorporated herein by reference to the extent its teachings are consistent with the present disclosure.

At (204), a set of a plurality of tires is identified for analysis. The set of tires should be made according to a similar manufacturing process such that a process harmonic associated with the candidate process effect will manifest in each of the plurality of tires in the set of tires. It should be appreciated that even though all test tires are made in accordance with the same or similar manufacturing process, it is possible that some process effects will not manifest their maximum influence in every tire. For example, a process effect having a harmonic number of less than 1.0 may only present its maximum amplitude in every other tire, every third tire, etc. in a consecutively manufactured set of tires.

It is not required that the plurality of test tires be stacked or manufactured in sequential order to implement the process harmonic analysis techniques of the present disclosure. The enhanced resolution analysis techniques disclosed herein can be implemented using a set of random tires manufactured using the similar manufacturing process. Any number of tires can be included in the set of tires, such as 10 or more tires. Generally, the sampling resolution of the composite process harmonic sampling will increase proportionally to the number of tires as more tires are included in the set of tires.

At (206), the method includes obtaining uniformity measurements of a uniformity parameter for each tire in the set of tires. The uniformity measurement can be for a plurality of points about each tire in the set of tires. As used herein, "obtaining uniformity measurements" can include actually performing the uniformity measurements or accessing the uniformity measurements stored in, for instance, a memory of a computing device.

The uniformity parameter can correspond, for example, to such uniformity parameters as radial run out (RRO), lateral run out (LRO), mass variance, balance, radial force variation (RFV), lateral force variation (LFV), tangential force variation (TFV), and other parameters. The uniformity measurements can be a waveform constructed from a number of data points measured in equally spaced points during one rotation of a tire according to a sampling resolution (e.g., 128, 256, 512 or other number of data points per tire revolution).

Consider a measured uniformity parameter (w) that is obtained at a plurality of equally spaced data points N around a tire such that measurements are obtained at respective data points $w_i$, for i=1, 2, . . . , N. It should be appreciated that the actual $w_i$ values may be conditioned in accordance with a variety of known techniques. For example, the $w_i$ values may be obtained at more than just a single rotation of a tire by averaging the obtained values at each data point during multiple rotations of the tire. In another example, the $w_i$ values may be conditioned by subtracting out the average magnitude value of the measured uniformity parameter across all respective data points such that the waveform is centered.

The uniformity measurements can include the combined effects of multiple process harmonics, multiple tire harmonics, other systematic effects, and random noise. In one embodiment, the uniformity measurements can be processed to remove the tire harmonics, random noise, and other systematic effects such that the uniformity measurements only represent one or more process harmonics. Alternatively, the raw uniformity measurements can be used by increasing the complexity of the models and analyses used to identify the magnitude of the process harmonics disclosed herein.

At (208), the method includes aligning the uniformity measurements for the set of tires to construct a composite process harmonic sampling for the set of tires. At least two different approaches can be used for aligning the uniformity measurements for the set of tires to construct a composite process harmonic sampling for the set of tires. For instance, the uniformity measurements can be aligned in the waveform domain or in the Fourier (i.e. frequency) domain. An example technique for aligning uniformity measurements in the waveform domain is discussed with reference to FIG. 3. An example technique for aligning uniformity measurements in the Fourier domain is discussed with reference to FIG. 7.

Referring back to FIG. 2 at (210), the method (200) includes estimating a process harmonic magnitude from the composite process harmonic sampling. As will be discussed in more detail below, the composite process harmonic sampling can be analyzed using a regression analysis or a programming analysis to identify the magnitude of the candidate process harmonic. An example technique for estimating the magnitude of a process harmonic using a composite process harmonic sampling constructed in the waveform domain is discussed with reference to FIG. 8 below. An example technique for estimating the magnitude of a process harmonic using a composite process harmonic sampling constructed in the Fourier domain is discussed with reference to FIG. 9 below.

Referring back to FIG. 2 at (212), the method includes modifying tire manufacture based on the estimated process harmonic magnitude to improve the uniformity of a tire. In particular, the estimated process harmonic magnitude can be used to better analyze uniformity measurements and/or to correct various aspects of the tire manufacturing process. For example, the estimated process harmonic magnitude can be compared to a threshold that is established based on cost and quality goals. Corrective action can be taken if the magnitude exceeds the threshold. The particular process harmonic can be used to determine the offending part of the tire manufacturing process that needs to be corrected/adjusted. One can apply methods to 1) suppress the process harmonic effect, 2) adjust for it using another process step, or 3) optimizing it against another tire or process harmonic. This correction can be applied in a pre-set configuration or in an in-line dynamic approach. This can be particularly beneficial in cases where the analysis techniques disclosed herein are used to search for unknown candidate process harmonics.

For example, once a process effect associated with a particular harmonic number (e.g. 1.2) is identified, the process effect can be used to track back to the cause of the process effect by first identifying possible cyclic elements in the tire manufacturing process. The relative period of these cyclic elements (e.g. 1.5 m, 1.33 m, 1.00 m and 0.75 m) can be computed and compared to the circumference of the tire (e.g. 1.2 m). This gives the process harmonic number for each potential cause (0.8, 0.9, 1.2 and 1.6). Then one can select the closest matching potential cause to the identified active process harmonic.

For instance, an extruder cycle can be matched with a process effect having a harmonic number of 1.2 in tread thickness variation. If the amplitude of the process effect exceeds a given level (e.g. 0.25 kg force) then corrective action can be taken to address the extruder cycle. Such corrective action can include retuning the extruder control system algorithm, changing the extruder speed, and/or purposely stretching the tread to counteract the variation.

As another example, the estimated process harmonic magnitude(s) can be determined across different time intervals of the manufacturing process. The estimated process harmonic magnitudes(s) can be compared across the time intervals to assess the stability of the process effects and to determine if any new upsets in the manufacturing process have occurred. For instance, if an estimated process harmonic magnitude changes across different time intervals, this can provide an indication of the need for a maintenance event to address the particular process effect. Specific changes in the process harmonic number can be correlated with specific operational changes in the production process. Corrective action can be taken to address changes in the estimated process harmonic magnitude(s). The extra measure of stability that can be achieved by the control of process harmonics is generally not easily achievable if one has only knowledge of the tire harmonic and can lead to direct increases in uniformity yields.

As yet another example, tire uniformity improvement can be achieved by altering the relative angular position of known manufacturing components in a tire to reduce the magnitude of the measured uniformity parameter for one or more tire harmonics of interest. For example, the extrusion induced cycle at process harmonic 0.8 can be matched with a storage induced cycle at the same process harmonic to achieve a more uniform shape for each individual tire. Because this type of uniformity analysis may be hindered by the impact of process effects whose periodic contributions to the composite uniformity waveform are not identical to the tire harmonics, the identification of such uniformity contributions resulting from process effects can help improve the accuracy of uniformity analysis as well as the tire building process.

Uniformity Measurement Alignment in the Waveform Domain

Figure 3:
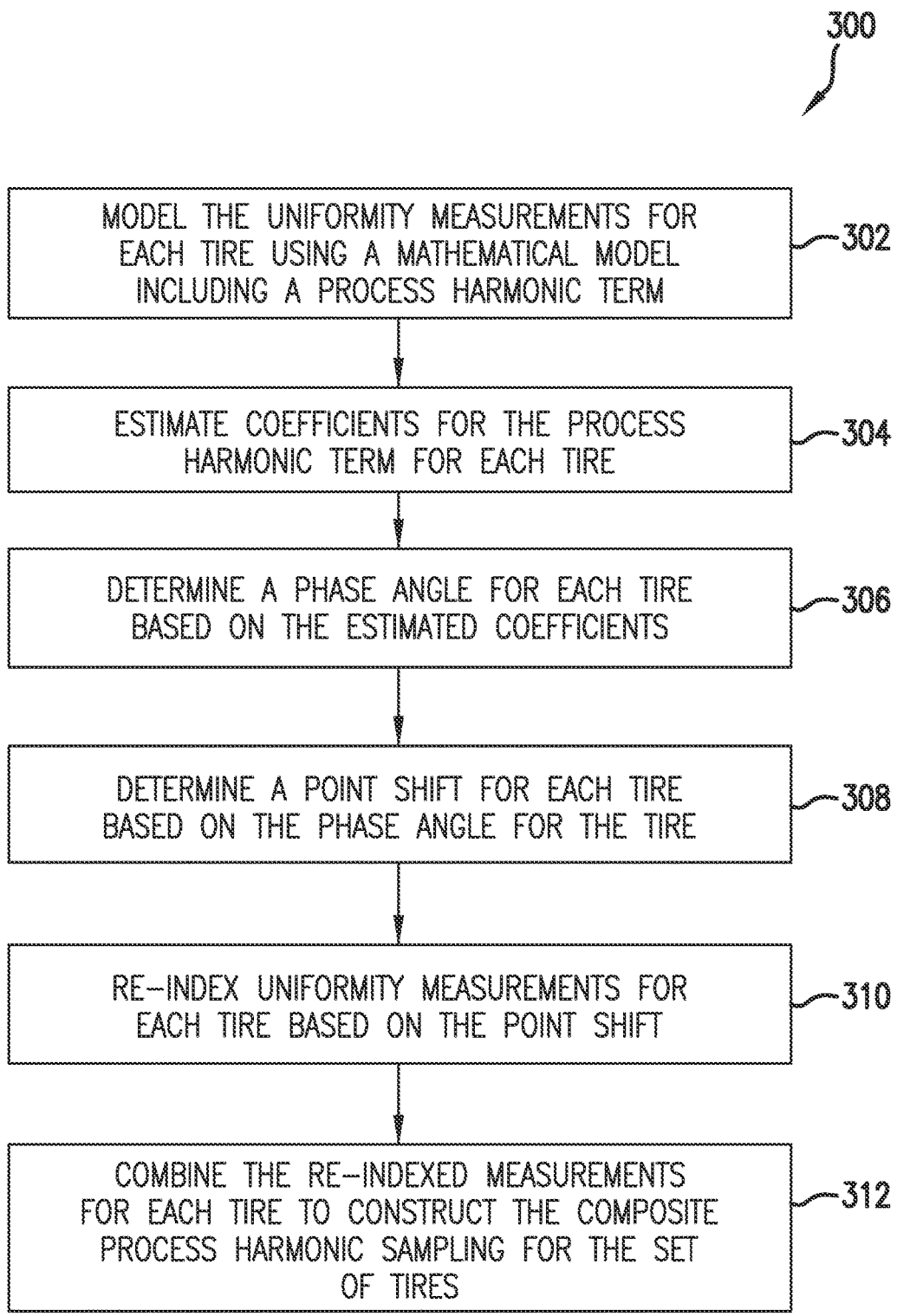
FIG. 3 depicts of flow diagram of an example method for aligning uniformity measurements according to an example embodiment of the present disclosure.

FIG. 3 depicts a flow diagram of an example method (300) for aligning the uniformity measurements in the waveform domain according to an example embodiment of the present disclosure. At (302), the uniformity measurements for each tire are modeled using a mathematical model including a process harmonic term. In an implementation involving raw uniformity measurements, the uniformity measurements can be modeled using the following mathematical model:

$$w_i = \mu + \sum_{p=1}^{P} a_p \cos\left(\frac{2\pi i h_p}{N}\right) + b_P \sin\left(\frac{2\pi i h_p}{N}\right) + \sum_{t=1}^{T} d_t \cos\left(\frac{2\pi i}{N}\right) + f_t \sin\left(\frac{2\pi i}{N}\right) + \varepsilon_i$$

where i is the particular data point out of N data points, $a_p$ and $b_p$ are coefficients associated with the P process harmonics, $d_t$ and $f_t$ are coefficients associated with the T tire harmonics, $h_p$ is the harmonic number associated with the P process harmonics, $\mu$ represents random noise and other systematic effects, and $\varepsilon_i$ represents the residual or error. The above model includes the process harmonic term:

$$\sum_{p=1}^{P} a_p \cos\left(\frac{2\pi i h_p}{N}\right) + b_P \sin\left(\frac{2\pi i h_p}{N}\right)$$

In the case where the uniformity measurements have been conditioned to be representative of a single process harmonic with zero tire effects, the model can be simplified as follows:

$$w_i = a_p \cos\left(\frac{2\pi i h_p}{N}\right) + b_P \sin\left(\frac{2\pi i h_p}{N}\right) + \varepsilon_i$$

Referring to FIG. 3 at (304), coefficients associated with the process harmonic term modeling components of the uniformity measurements for each tire can be estimated. In one implementation, the coefficients can be estimated using a regression analysis, such as a linear regression analysis. The regression analysis will estimate coefficients $a_p$ and $b_p$ such that the mathematical model best fits the uniformity measurements in the sense of least squares. Another approach that can be used to estimate the coefficients includes a programming approach. Under a programming approach, the coefficients are estimated to minimize the difference or error between the uniformity measurement at a data point and the estimated value for the data point using the mathematical model. The coefficients can be estimated using a linear, quadratic, or other suitable programming approach.

Once the coefficients associated with the process harmonic term have been identified for each tire, a phase angle providing the azimuthal location of a maximum magnitude of the process harmonic in the tire can be determined for each tire using the estimated coefficients (306). For instance, the phase angle for each tire can be determined as follows:

$$\theta = \tan^{-1}\frac{b_p}{a_p}$$

where θ is the phase angle determined for the tire. Due to the inherent errors in determining the phase angle for each tire based on coefficients determined using a regression or programming analysis, the determined phase angle for each tire will also have a slight error. The slight errors for the phase angles of the tires will cause the uniformity measurements for each tire to be slightly offset when aligned according to example embodiments of the present disclosure.

At (308), a point shift is determined for each tire based on the phase angle associated with the tire. The point shift for each tire simply expresses in terms of data points the azimuthal location of the maximum magnitude of the process harmonic on the tire. The point shift can be determined based on the sampling resolution of the data points. For instance, for a sampling resolution of N data points, the phase angle can be converted to a point shift according to the following when the phase angle is express in degrees:

point shift=(N*θ)/360

At (310), the uniformity measurements for each tire are re-indexed based on the point shift. More specifically, the uniformity measurements for a tire can be re-indexed to match the uniformity measurements for the other tires in the set by changing the index from the original 1 to N to a new index based on the point shift. For example, uniformity measurements associated with a point shift of 29.1287 can be re-indexed by shifting each data point by 29.1287 from 1–29.1287 to N–29.1287. Any negative indices can be converted to positive indices by wrapping around to the other end of the tire. In other words, the negative index i can be converted to positive index as N+i (e.g. −1 to N−1; −2 to N−2, etc.).

In the implementation where the uniformity measurements are raw uniformity measurements, the process harmonic component of the uniformity measurements attributable to the process harmonic can be extracted from the raw uniformity measurements for each tire using the process harmonic term of the mathematical model. The process harmonic component for each tire can then be re-indexed as discussed above.

Figure 4:
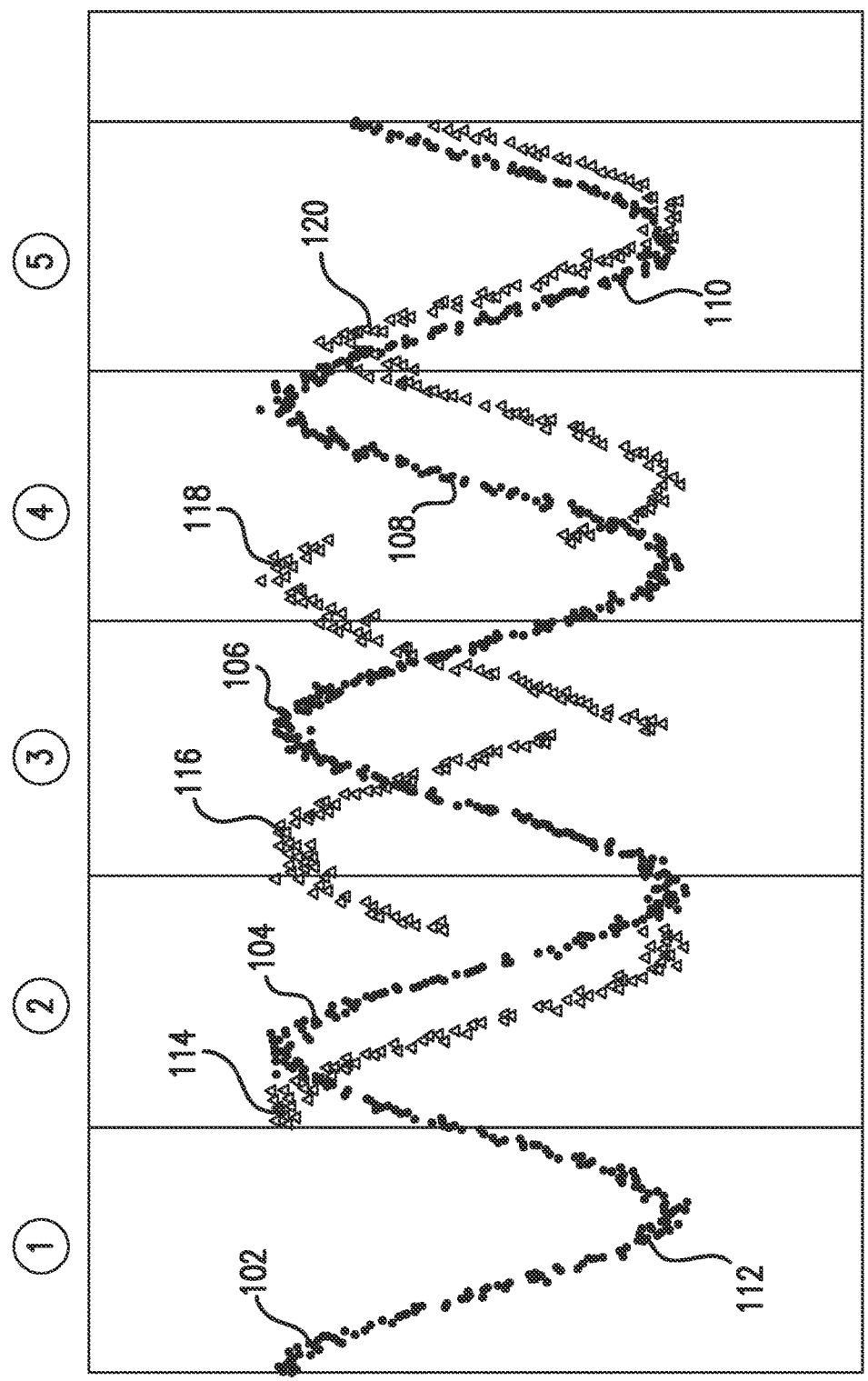
FIG. 4 depicts aligned uniformity measurements for a set of tires according to an example embodiment of the present disclosure.

FIG. 4 depicts example uniformity measurements for a set of five tires before and after re-indexing the uniformity measurements. In particular, uniformity measurements 102, 104, 106, 108, and 110 represent the process harmonic component of the original uniformity measurements for the five tires. Uniformity measurements 112, 114, 116, 118, and 120 represent the re-indexed process harmonic components of the uniformity measurements after the process harmonic components have been aligned according to example aspects of the present disclosure.

Referring back to FIG. 3 at (312), the re-indexed uniformity measurements for each tire are combined to construct the composite process harmonic sampling for the set of tires. Due to the error in determining the phase angle for the uniformity measurements for each tire, the re-indexed uniformity measurements for each tire in the set of tires will be slightly offset from one another. As a result, when the re-indexed uniformity measurements are combined into a single sampling of the process harmonic, the sampling has a higher resolution than the resolution of the measured data points about the tire.

The composite process harmonic sampling can be a waveform associated with one cycle of the candidate process effect. The cycle length of the candidate process effect can be determined based on the rate of introduction associated with the candidate process effect, such as based on the harmonic number associated with the candidate process effect. For instance, a candidate process effect associated with a harmonic number of h can have a cycle length of (N/h). For example, a candidate process effect associated with a harmonic number of 0.773 can have a cycle length of 166 data points when N=128 data points. The re-indexed uniformity measurements that are slightly offset from one another can be combined according to their new indices to generate the composite process harmonic sampling.

Figure 5:
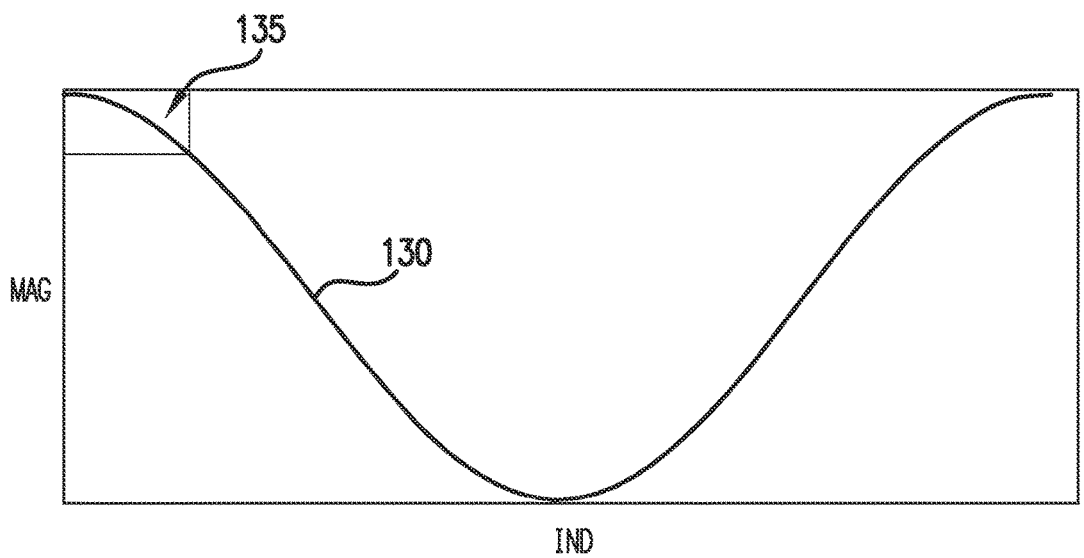
FIGS. 5 and 6 depict a composite process harmonic sampling constructed from the aligned uniformity measurements according to an example embodiment of the present disclosure.
Figure 6:
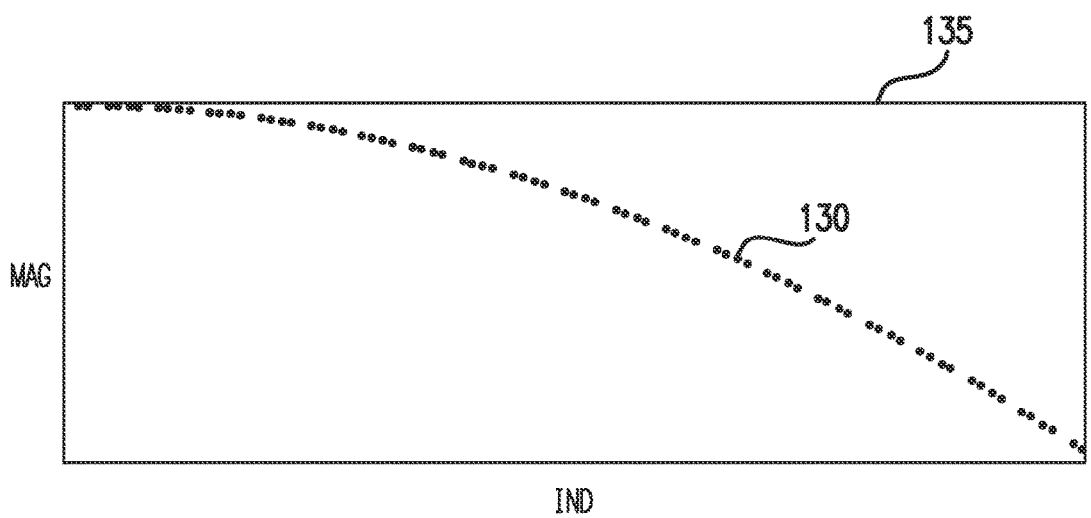

FIG. 5 depicts an example composite process harmonic sampling 130 generated in the waveform domain according to an example embodiment of the present disclosure. As shown, the composite process harmonic sampling 130 represents one cycle of the candidate process effect. FIG. 6 depicts a close up of a portion 135 of the composite process harmonic sampling 130. As demonstrated in FIG. 6, the resolution of the composite process harmonic sampling 130 is much greater than the original sampling resolution of data points about the tire. More specifically, the composite process harmonic sampling 130 includes many more data points than the data points (e.g. 128 data points) associated with the uniformity measurements about each tire in the set of tires.

Figure 8:
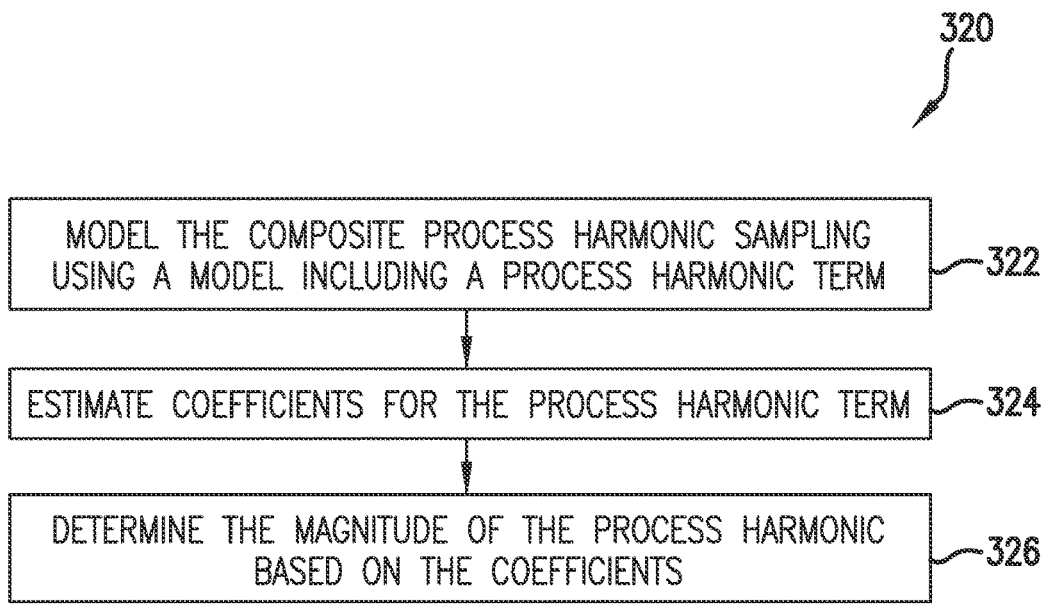
FIG. 8 depicts a flow diagram of an example method for estimating a magnitude of a process harmonic from a composite process harmonic sampling according to an example embodiment of the present disclosure.

Once the composite process harmonic sampling has been constructed, the composite process harmonic sampling can be analyzed to determine the magnitude of the process harmonic. FIG. 8 depicts a flow diagram of an example method (320) for estimating the magnitude of the process harmonic from a composite process harmonic sampling constructed in the waveform domain according to an example embodiment of the present disclosure. The method (320) of FIG. 8 involves estimating the process harmonic magnitude by constructing rectangular coefficients from the composite process harmonic sampling and estimating the magnitude of the process harmonic based on the rectangular coefficients.

More particularly, at (322) the composite process harmonic sampling is modeled using a mathematical model that includes a process harmonic term. For instance, the process harmonic sampling can be modeled as follows:

$$w_i = a_p \cos\left(\frac{2\pi i h_p}{N}\right) + b_p \sin\left(\frac{2\pi i h_p}{N}\right) + \varepsilon_i$$

where $w_i$ is representative of re-indexed uniformity measurement for each data point i in the composite process harmonic sampling, $a_p$ and $b_p$ are the rectangular coefficients associated with the process harmonic term, $h_p$ is the harmonic number for the candidate process effect, and $\varepsilon_i$ is the residual or error.

The coefficients for the process harmonic term can then be estimated from the composite process harmonic sampling using a regression analysis, a programming analysis, or other suitable analysis (324). The magnitude of the process harmonic can then be determined from the estimated coefficients (326). For instance, the magnitude of the process harmonic can be determined as follows:

$$MAG = \sqrt{a_p^2 + b_p^2}.$$

where MAG is the magnitude of the process harmonic.

The alignment techniques in the waveform domain can be used to estimate magnitudes of process harmonics for multiple candidate process effects. In particular, the process of aligning uniformity measurements and constructing a process harmonic sampling can be performed independently for each candidate process effect. For example, three different process effects can be identified as candidates for analysis: effect1, effect2, and effect3. The candidate process effects can have close rates of introduction (e.g. similar harmonic numbers). The magnitude of the process harmonics associated with each of the three candidate process effects can be determined independently using the techniques discussed in detail above. In particular, the analysis can be performed three times, one for each candidate process effect to the exclusion of the other two process effects.

For example, the uniformity measurements can be aligned in a manner best suited for effect1 to construct a composite process harmonic sampling for effect1. After estimating the magnitude of the process harmonic associated with effect1, the uniformity measurements can be aligned in a manner best suited for effect2 to construct a composite process harmonic sampling for effect2. Once the magnitude of the process harmonic associated with effect2 is determined, the same analysis can be applied for effect3. In other words, there are three separate analyses in which the uniformity measurements are re-indexed to best fit effect1, then effect2, and finally effect3.

Uniformity Measurement Alignment in the Fourier Domain

Figure 7:
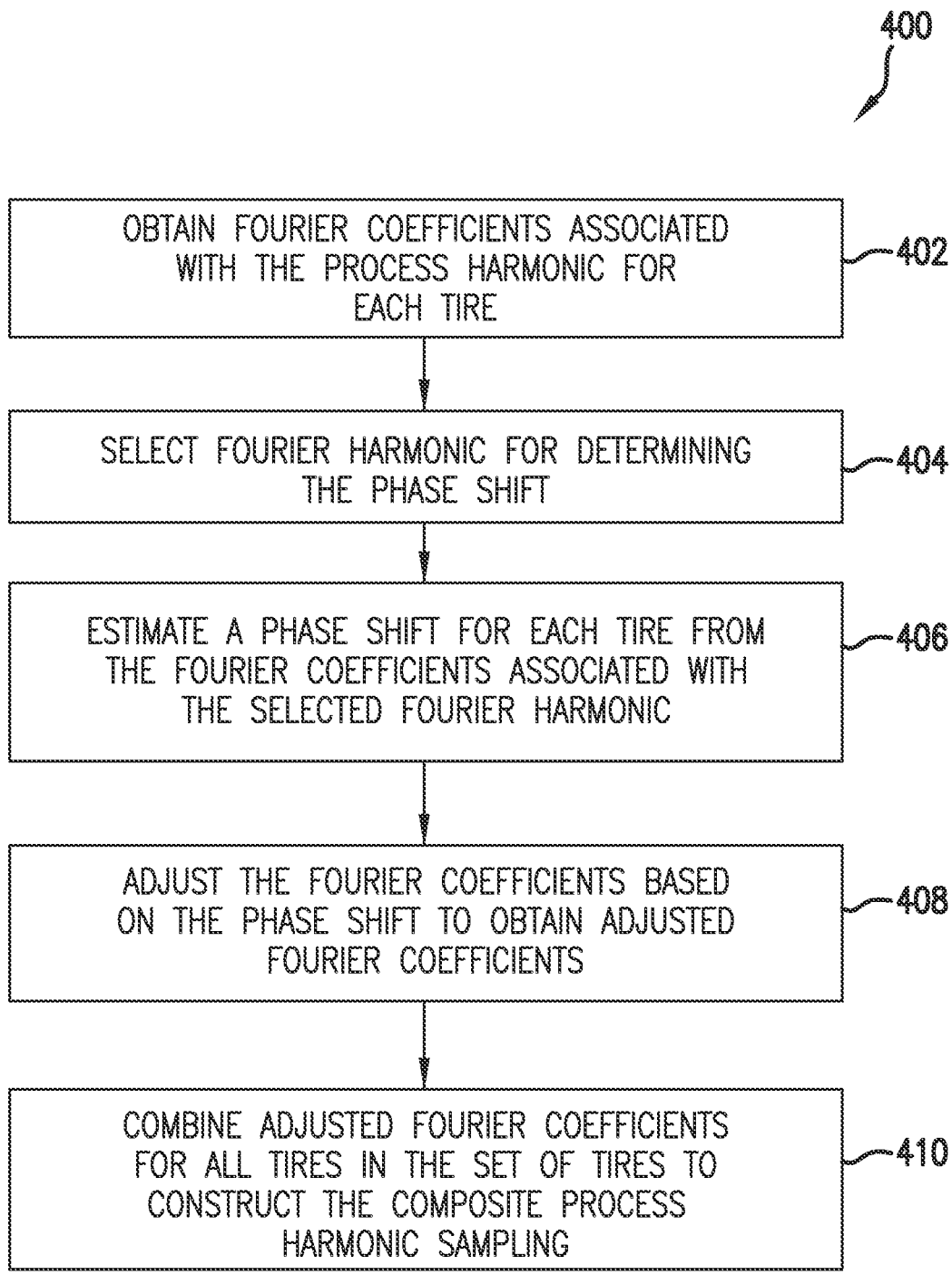
FIG. 7 depicts a flow diagram of an example method for aligning uniformity measurements according to another example embodiment of the present disclosure.

According to another example embodiment of the present disclosure, the uniformity measurements can also be aligned to construct a composite process harmonic sampling in the Fourier domain. FIG. 7 depicts a flow diagram of an example method (400) for aligning uniformity measurements in the Fourier domain according to an example embodiment of the present disclosure. At (402), the method includes obtaining Fourier coefficients associated with the process harmonic for each tire in the set of tires. As used herein, "obtaining Fourier coefficients" can refer to determining the Fourier coefficients from the uniformity measurements or accessing previously determined or measured Fourier coefficients stored, for instance, in a memory.

In particular, m Fourier coefficients (associated with both sine and cosine terms) can be determined for each tire for m harmonic components of the process harmonic. For instance, Fourier coefficients can be determined by decomposing the uniformity measurements using a Fourier analysis into a plurality of Fourier harmonics, such as a 1st harmonic, 2d harmonic, 3rd harmonic, 4th harmonic etc. Each Fourier harmonic can include a cosine term and a sine term. The Fourier coefficients for each Fourier harmonic can include a coefficient associated with the cosine term and the sine term. Fourier coefficients can be obtained for up to N/2 Fourier harmonics.

The Fourier coefficients for any or all Fourier harmonics can be used to determine a phase shift for each tire. At (404), a particular Fourier harmonic is selected for determining the phase shift for each tire. For instance, the Fourier coefficients associated with the 1st Fourier harmonic can be selected for determining the phase shift for each tire. However, any other suitable Fourier harmonic can be selected for determining the phase shift, such as the 2d harmonic, 3rd harmonic, 4th harmonic, etc.

At (406), the phase shift for each tire is estimated based on the Fourier coefficients associated with the selected Fourier harmonic. The phase shift can be the estimated angular rotations that are necessary to bring the cosine terms of the selected Fourier harmonic of each tire equal to the full magnitudes of the harmonic component and the sine terms equal to zero. In a particular implementation, the phase shift for each tire can be determined as follows:

$$\theta = \tan^{-1} \frac{y_p}{x_p}$$

where $\theta$ is the phase angle determined for the tire, $y_p$ is the Fourier coefficient associated with the sine term of the selected Fourier harmonic for the tire, and $x_p$ is the Fourier coefficient associated with the cosine term of the selected Fourier harmonic for the tire.

Once the phase angle for each tire has been determined, the method can include adjusting the Fourier coefficients for each tire based on the phase angle determined for the tire to determine adjusted Fourier coefficients (408). The adjusted coefficients for each tire can be determined based on the phase angle for the tire according to the following:

$$x_\alpha = \cos*\cos\theta + \sin*\cos\theta$$

$$y_\alpha = -\sin*\cos\theta + \cos*\sin\theta$$

where $\theta$ is the phase angle determined for the tire, $y_\alpha$ is the adjusted Fourier coefficient associated with the sine term of the selected Fourier harmonic for the tire, and $x_\alpha$ is the adjusted Fourier coefficient associated with the cosine term of the selected Fourier harmonic for the tire. The adjusted Fourier coefficients will be aligned such that the full magnitude of the Fourier component is associated with the cosine terms and the coefficient associated with the sine terms approach zero.

At (410), the adjusted Fourier coefficients for all tires can be combined together to provide the composite process harmonic sampling. The combined adjusted Fourier coefficients for all tires can then be analyzed using a single analysis technique (e.g. regression technique or programming technique) to determine the magnitude of the process harmonic.

Figure 9:
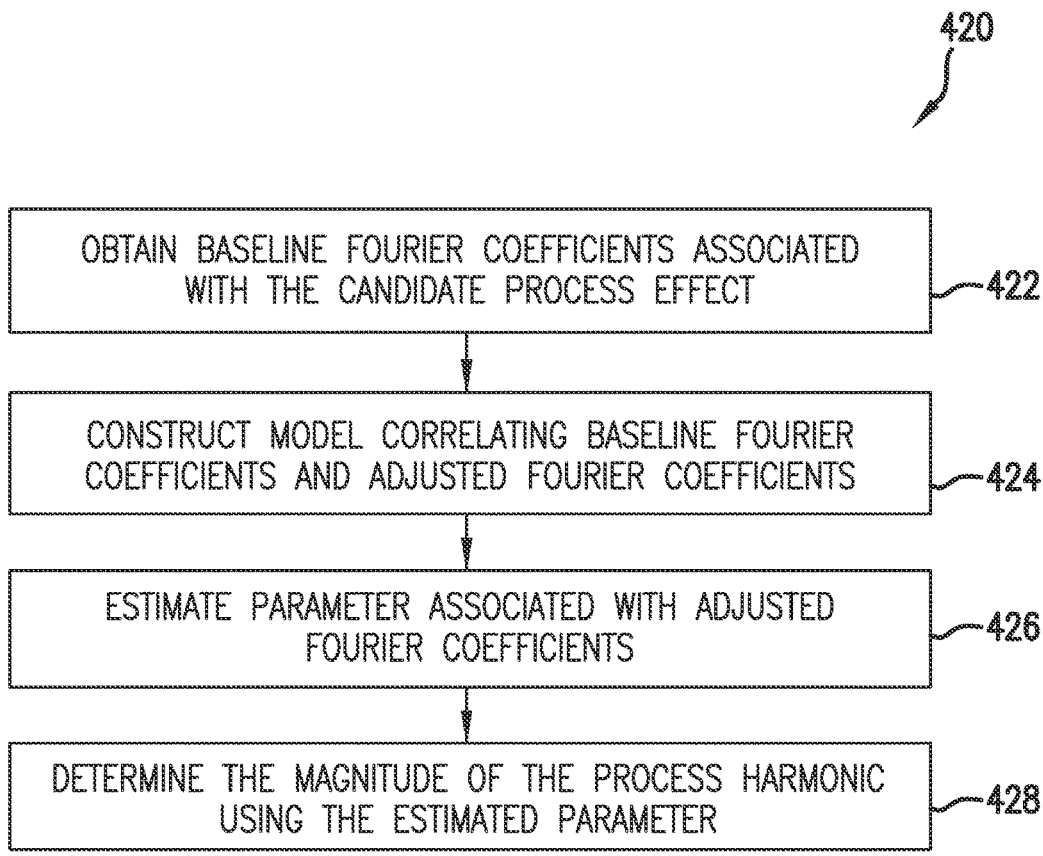
FIG. 9 depicts a flow diagram of an example method for estimating a magnitude of a process harmonic from a composite process harmonic sampling according to an example embodiment of the present disclosure.

FIG. 9 depicts a flow diagram of an example method (420) for determining a magnitude of a process harmonic from a composite process harmonic sampling constructed in the Fourier domain according to an example embodiment of the present disclosure. At (422), baseline coefficients associated with the candidate process effect are obtained. The baseline coefficients will be used to match against the adjusted Fourier coefficients to determine the magnitude of the process harmonic. The baseline coefficients can be obtained by constructing a baseline simulated waveform for the particular candidate process effect as follows:

$$base_i = \cos\left(\frac{2\pi i h_p}{N}\right)$$

where $base_i$ is a baseline value for each datapoint i in the baseline waveform, $h_p$ is the harmonic number associated with the candidate process effect, and N is the number of data points for the uniformity measurements about the tire.

Fourier analysis can be performed on the baseline waveform to determine baseline Fourier coefficients for the candidate process harmonic. In particular, Fourier coefficients can be determined by decomposing the baseline uniformity waveform using a Fourier analysis into a plurality of baseline Fourier harmonics, such as a 1st harmonic, 2d harmonic, 3rd harmonic, 4th harmonic, etc. Each baseline Fourier harmonic can include a cosine term and a sine term. The baseline Fourier coefficients for each Fourier harmonic can include a coefficient associated with the cosine term and the sine term.

Once the baseline Fourier coefficients are obtained, a model can be constructed correlating the baseline Fourier coefficients with the adjusted Fourier coefficients (424). An example model is provided below:

$$w = P \cdot \beta + \varepsilon$$

where w represents the adjusted Fourier coefficients, P represents the baseline Fourier coefficients associated with the candidate process effect, $\beta$ represents a parameter for correlating the baseline Fourier coefficients and the adjusted Fourier coefficients, and $\varepsilon$ represents a residual(s). Since the adjusted Fourier coefficients associated with the sine terms approach zero, the model can correlate the Fourier coefficients associated with the cosine terms.

At (426), the parameter correlating the baseline Fourier coefficients with the adjusted Fourier coefficients is estimated using a regression analysis or a programming analysis. The magnitude of the process harmonic can then be determined from the estimated parameter (428). For instance, the magnitude of the process harmonic can be equal to the estimated parameter.

The alignment techniques in the Fourier domain can be used to estimate magnitudes of process harmonics for multiple candidate process effects. In particular, the phase shift information can be determined for each tire for each separate candidate process effect. The phase shift information can be used to determine adjusted Fourier coefficients for each tire for each separate candidate process effect. Baseline Fourier coefficients can then be obtained for each candidate process effect. Regression and/or programming techniques can then be used to estimate a process harmonic magnitude for each candidate process harmonic from the adjusted Fourier coefficients and baseline Fourier coefficients.

Example System for Improving Tire Uniformity

Figure 10:
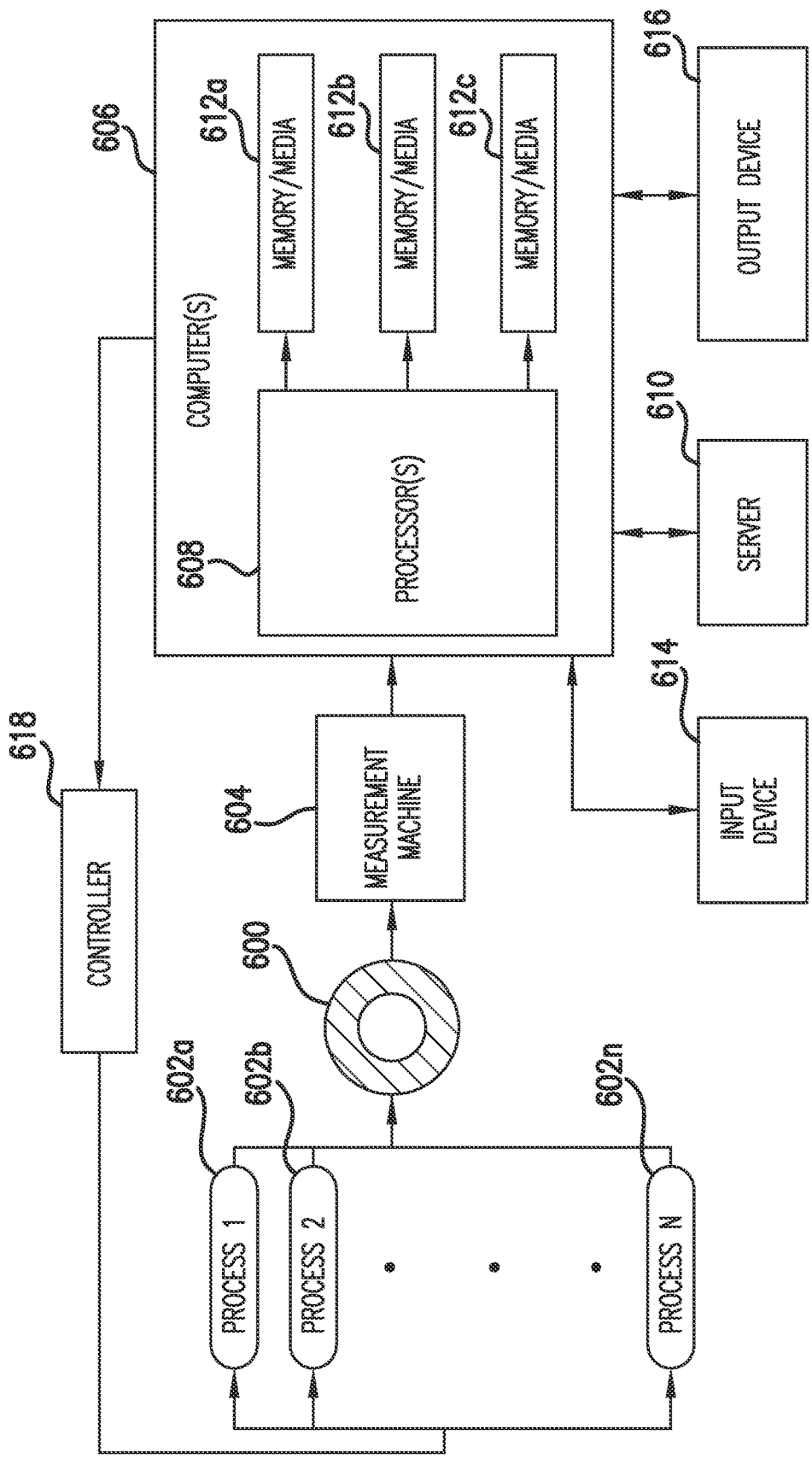
FIG. 10 depicts an example system for improving the uniformity of a tire according to an example embodiment of the present disclosure.

Referring now to FIG. 10, a schematic overview of example system components for implementing the above-described methods is illustrated. An example tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing mold, and curing the finished green tire, etc. Such respective process elements are represented as 602a, 602b, . . . , 602n in FIG. 10 and combine to form example tire 600. It should be appreciated that a batch of multiple tires can be constructed from one iteration of the various processes 602a through 602n.

Referring still to FIG. 10, a measurement machine 604 is provided to obtain the various uniformity measurements. In general, such a measurement machine can include such features as a mounting fixture on which a tire is mounted and rotated centrifugally at one or more speeds. In one example, laser sensors are employed to operate by contact, non-contact or near contact positioning relative to tire 600 in order to determine the relative position of the tire surface at multiple data points (e.g., 128 points) as it rotates about a center line. The measurement machine can also include a road wheel used to load the tire to obtain force measurements as the tire is rotated in the measurement machine 604.

The uniformity measurements obtained by measurement machine 604 can be relayed such that they are received at one or more computing devices 606, which may respectively contain one or more processors 608, although only one computer and processor are shown in FIG. 10 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. Additional memory/media elements can be used without deviating from the scope of the present disclosure. The computing/processing devices of FIG. 10 may be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in the memory elements 612a, 612b, and 612c to cause the processor(s) 608 to perform operations. The operations can include: identifying at least one candidate process effect; obtaining uniformity measurements of a uniformity parameter for each tire in a set of a plurality of tires; aligning the uniformity measurements for the set of tires based at least in part on an azimuthal location of a maximum amplitude of the process harmonic on each tire in the set of tires to construct a composite process harmonic sampling for the set of tires; and estimating a magnitude of the process harmonic from the composite process harmonic sampling.

EXAMPLE #1

Uniformity measurements containing a process harmonic for five tires were simulated. A candidate process harmonic associated with a harmonic number of 0.773 was identified for analysis. Phase angle and point shift information was determined for the five tires using the waveform alignment approach. Table 1 provides a summary of the determined coefficients, phase angle, and point shift information for the five tires:

TABLE 1

| Tire | Cosine term | Sine term | Magnitude | Angle | Point shift |
|---|---|---|---|---|---|
| 1 | 0.99664 | −0.00566 | 0.99666 | −0.326 | −0.1158 |
| 2 | 0.14070 | 0.99162 | 1.00156 | 81.924 | 29.1287 |
| 3 | −0.96455 | 0.29299 | 1.00807 | 163.104 | 57.9924 |
| 4 | −0.42277 | −0.89825 | 0.99277 | −115.205 | −40.9617 |
| 5 | 0.83651 | −0.54792 | 0.99998 | −33.225 | −11.8133 |

The uniformity measurements for the five tires were re-indexed according to the determined point shift information, and a composite process harmonic sampling was generated using the enhanced resolution techniques disclosed herein. Regression analysis was performed on the composite process harmonic sampling to identify the magnitude of the process harmonic.

For comparison purposes, the magnitude of the process harmonic was also determined using a singlet analysis. A singlet analysis involves using regression to fit a process harmonic to the uniformity measurements for each individual tire and averaging the magnitudes of the process harmonic determined for each individual tire using the regression analysis. Table 2 compares the estimated magnitude determined from the singlet approach and the enhanced resolution approach.

TABLE 2

| Method | Estimated magnitude | Approximate standard error |
|---|---|---|
| Singlet (averaging the 5 results) | 0.999 | 0.0417 |
| Enhanced resolution (aligned) | 0.993 | 0.0226 |

The true value of the magnitude of the process harmonic was 1. As shown, the enhanced resolution approach provides a nearly equally accurate estimate of the magnitude of the process harmonic, but does so with improved standard error relative to the singlet approach. In this example, the precision of the enhanced resolution approach improves by about 45.85% relative to the singlet approach.

EXAMPLE #2

Process harmonics associated with three different candidate process effects were simulated across five tires as set forth in Table 3 below:

TABLE 3

| Effect number | Magnitude | Azimuth (degrees) | Harmonic number |
|---|---|---|---|
| 1 | 1 kgs | 0 | 0.973 |
| 2 | .8 kgs | 80 | 0.921 |
| 3 | .6 kgs | 270 | 0.884 |

Process harmonic magnitudes were estimated for each candidate process effect using the singlet approach and the enhanced resolution approach according to example aspects of the present disclosure. Table 4 below compares the results of the estimated magnitudes for the singlet method and the enhanced resolution method.

TABLE 4

| Effect number | Singlet mag | Singlet std err | Enhancedres mag | Enhancedres std err | True value |
|---|---|---|---|---|---|
| 1 | 15.97 kgs | ~8 kgs | 0.29 kgs | ~0.038 kgs | 1.00 kgs |
| 2 | 41.40 kgs | ~19 kgs | 0.48 kgs | ~0.035 kgs | 0.8 kgs |
| 3 | 25.99 kgs | ~19 kgs | 0.59 kgs | ~0.038 kgs | 0.6 kgs |

Notice the near complete breakdown of the singlet method because of the loss of resolution that occurs when analyzing candidate process effects with closely spaced rates of introduction. Yet the phase angles estimated using the singlet method can be used to align the uniformity measurements for the enhanced resolution approach. The enhanced resolution approach, even though phase angles are not estimated perfectly, still vastly outperforms the singlet approach. Using process harmonic search techniques to determine the phase angle information can provide even better results than estimating the phase angle using the singlet approach.

EXAMPLE #3

A numerical example demonstrating aligning uniformity measurements in the Fourier coefficient domain is provided below. A single process harmonic having an amplitude of 1 kg and associated with a candidate process effect of 0.877 was simulated over a set of 5 tires with 128 data points per tire. The first four (m=4) Fourier coefficients for the cosine and sine terms of the first four Fourier harmonics for each of the five tires is provided in Table 5 below.

TABLE 5

| Fourier Harmonic | Tire | Cosine Coefficient | Sine Coefficient | Magnitude |
|---|---|---|---|---|
| 1 | 1 | 0.85852 | 0.36217 | 0.93178 |
| 2 | 1 | 0.05942 | 0.03660 | 0.06978 |
| 3 | 1 | 0.03431 | 0.03857 | 0.05162 |
| 4 | 1 | 0.00968 | 0.02365 | 0.02555 |
| 1 | 2 | 0.39793 | 0.92768 | 1.00943 |
| 2 | 2 | 0.02034 | 0.13894 | 0.14043 |
| 3 | 2 | 0.01856 | 0.07626 | 0.07848 |
| 4 | 2 | 0.02042 | 0.05854 | 0.06200 |

TABLE 5-continued

| Fourier Harmonic | Tire | Cosine Coefficient | Sine Coefficient | Magnitude |
|---|---|---|---|---|
| 1 | 3 | −0.28186 | 0.98711 | 1.02656 |
| 2 | 3 | −0.00493 | 0.13203 | 0.13212 |
| 3 | 3 | −0.00328 | 0.07959 | 0.07966 |
| 4 | 3 | −0.00143 | 0.06058 | 0.06059 |
| 1 | 4 | −0.81118 | 0.48490 | 0.94506 |
| 2 | 4 | −0.05481 | 0.05950 | 0.08089 |
| 3 | 4 | −0.01996 | 0.03775 | 0.04270 |
| 4 | 4 | −0.00405 | 0.01745 | 0.01792 |
| 1 | 5 | −0.87730 | −0.28513 | 0.92247 |
| 2 | 5 | −0.06347 | −0.04291 | 0.07662 |
| 3 | 5 | −0.02388 | −0.01438 | 0.02788 |
| 4 | 5 | −0.00488 | −0.00927 | 0.01048 |

The Fourier coefficients of the first harmonic coefficients were selected to compute the phase angle for each tire. The phase angle was computed to align the coefficients such that the cosine terms are equal to the full magnitude and the sine terms are equal to zero. The determined phase angle information for each tire is provided in Table 6 below.

TABLE 6

| Tire | Cosine | Sine | Magnitude | Angle |
|---|---|---|---|---|
| 1 | 0.85852 | 0.36217 | 0.93178 | 22.873 |
| 2 | 0.39793 | 0.92768 | 1.00943 | 66.783 |
| 3 | −0.28186 | 0.98711 | 1.03656 | 105.937 |
| 4 | −0.81118 | 0.48490 | 0.94506 | 149.130 |
| 5 | −0.87730 | −0.28513 | 0.92247 | 190.004 |

The phase angle for each was used to determine adjusted Fourier coefficients to align the uniformity measurements. The adjusted Fourier coefficients are provided in Table 7 below. Table 7 demonstrates the near zeroing of the adjusted sine coefficients.

TABLE 7

| Fourier Harmonic | Tire | Adjusted Cosine Coefficient | Adjusted Sine Coefficient | New Phase Angle |
|---|---|---|---|---|
| 1 | 1 | 0.93178 | −4.635E−18 | −2.8501E−16 |
| 2 | 1 | 0.06978 | −5.7598E−20 | −4.729E−17 |
| 3 | 1 | 0.05162 | −2.3378E−18 | −2.5949E−15 |
| 4 | 1 | 0.02555 | −4.557E−19 | −1.0218E−15 |
| 1 | 2 | 1.00943 | −1.301E−17 | −7.3848E−16 |
| 2 | 2 | 0.14043 | −1.4232E−17 | −5.8068E−15 |
| 3 | 2 | 0.07848 | 5.41085E−18 | 3.95006E−15 |
| 4 | 2 | 0.06200 | 2.95276E−18 | 2.7285E−15 |
| 1 | 3 | 1.02656 | 6.1149E−17 | 3.41294E−15 |
| 2 | 3 | 0.13212 | −5.8458E−18 | −2.535E−15 |
| 3 | 3 | 0.07966 | 1.44927E−18 | 1.04237E−15 |
| 4 | 3 | 0.06059 | 2.88986E−18 | 2.73262E−15 |
| 1 | 4 | 0.94506 | −9.6711E−17 | −5.8633E−15 |
| 2 | 4 | 0.08089 | 4.24872E−18 | 3.00942E−15 |
| 3 | 4 | 0.04270 | 2.57159E−18 | 3.45025E−15 |
| 4 | 4 | 0.01792 | −1.6305E−19 | −5.2147E−16 |
| 1 | 5 | 0.92247 | −4.5347E−17 | −2.8166E−15 |
| 2 | 5 | 0.07662 | −9.3445E−18 | −6.988E−15 |
| 3 | 5 | 0.02788 | 1.96512E−19 | 4.03887E−16 |
| 4 | 5 | 0.01048 | −4.1674E−19 | −2.2788E−15 |

Baseline Fourier coefficients for the candidate process harmonic were obtained. Table 8 provides the baseline Fourier coefficients for the candidate process harmonic.

TABLE 8

| Fourier Harmonic | Tire | Baseline Cosine Coefficient | Baseline Sine Coefficient |
|---|---|---|---|
| 1 | 1 | 0.87791 | 0.93373 |
| 2 | 1 | 0.05985 | 0.07322 |
| 3 | 1 | 0.02445 | 0.03478 |
| 4 | 1 | .01398 | 0.02262 |
| 1 | 2 | 0.87791 | 0.93373 |
| 2 | 2 | 0.05985 | 0.07322 |
| 3 | 2 | 0.02445 | 0.03478 |
| 4 | 2 | 0.01398 | 0.02262 |
| 1 | 3 | 0.87791 | 0.93373 |
| 2 | 3 | 0.05985 | 0.07322 |
| 3 | 3 | 0.02445 | 0.03478 |
| 4 | 3 | 0.01398 | 0.02262 |
| 1 | 4 | 0.87791 | 0.93373 |
| 2 | 4 | 0.05985 | 0.07322 |
| 3 | 4 | 0.02445 | 0.03478 |
| 4 | 4 | 0.01398 | 0.02262 |
| 1 | 5 | 0.87791 | 0.93373 |
| 2 | 5 | 0.05985 | 0.07322 |
| 3 | 5 | 0.02445 | 0.03478 |
| 4 | 5 | 0.01398 | 0.02262 |

An estimated harmonic magnitude was estimated by running a regression of the adjusted Fourier coefficients to the baseline Fourier coefficients. The magnitude of the process harmonic was estimated at 0.97912 with a standard error of 0.01787.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of improving the uniformity of a tire, comprising:
    identifying at least one candidate process effect;
    obtaining uniformity measurements of a uniformity parameter for each tire in a set of a plurality of tires, the uniformity measurements for each tire being obtained for a plurality of points about the tire, the uniformity measurements containing a process harmonic associated with the candidate process effect;
    aligning, with one or more computing devices, the uniformity measurements for the set of tires based at least in part on an azimuthal location of a maximum magnitude of the process harmonic on each tire in the set of tires to construct a composite process harmonic sampling;
    estimating, with the one or more computing devices, a magnitude of the process harmonic from the composite process harmonic sampling; and
    modifying tire manufacture based on the magnitude of the process harmonic;
    wherein the uniformity measurements for each tire are obtained for the plurality of points about the tire at a first sampling resolution, the composite process harmonic sampling being associated with a second sampling resolution, the second sampling resolution being greater than the first sampling resolution.

2. The method of claim 1, wherein the composite process harmonic sampling comprises a waveform associated with one cycle of the candidate process effect.

3. The method of claim 1, wherein aligning, with the one or more computing devices, the uniformity measurements for the set of tires comprises:
    modeling the uniformity measurements for each tire in the set of tires using a mathematical model including a process harmonic term;
    estimating coefficients for the process harmonic term of each tire; and
    determining a phase angle for each tire based on the estimated coefficients for the process harmonic term of the tire.

4. The method of claim 3, wherein the coefficients of the process harmonic term are estimated using a regression analysis or a programming analysis.

5. The method of claim 3, wherein aligning, with the one or more computing devices, the uniformity measurements for the set of tires determined for each tire comprises:
    determining a point shift for each tire based on the phase angle determined for the tire; and
    re-indexing the uniformity measurements for each tire based on the point shift determined for the tire.

6. The method of claim 5, wherein the composite process harmonic sampling is constructed by combining the uniformity measurements re-indexed for each tire in the set of tires.

7. The method of claim 1, wherein the magnitude of the process harmonic is estimated from the composite process harmonic sampling by:
    modeling the composite process harmonic sampling using a model including a process harmonic term;
    estimating coefficients for the process harmonic term; and
    determining the magnitude of the process harmonic based on the estimated coefficients.

8. The method of claim 1, wherein aligning, with the one or more computing devices, the uniformity measurements for the set of tires comprises:
    obtaining Fourier coefficients associated with the process harmonic for each tire;
    estimating a phase angle from the Fourier coefficients associated with the process harmonic for each tire;
    adjusting the Fourier coefficients associated with the process harmonic for each tire based at least in part on the phase angle to obtain adjusted Fourier coefficients.

9. The method of claim 8, wherein estimating, with the one or more computing devices, a magnitude of the process harmonic from the composite process harmonic comprises:
    obtaining a set of baseline Fourier coefficients for the candidate process effect; and
    estimating the magnitude of the process harmonic based at least in part on the adjusted Fourier coefficients for the set of tires and the baseline Fourier coefficients for the candidate process effect.

10. The method of claim 9, wherein the magnitude of the process harmonic is estimated using a regression analysis or a programming analysis.

11. The method of claim 1, wherein the plurality of tires in the set of tires are made in a similar manufacturing process such that the process harmonic will manifest in each of the plurality of tires in the set of tires.

12. The method of claim 11, wherein the plurality of tires are not manufactured in a sequential order during the manufacturing process.

13. The method of claim 1, wherein the uniformity parameter comprises one or more of radial run out (RRO), lateral run out (LRO), mass variance, balance, radial force variation (RFV), lateral force variation (LFV) and tangential force variation (TFV).

14. A system for improving the uniformity of tires, the system comprising:
  a uniformity measurement machine configured to measure a uniformity waveform for each tire in a plurality of tires, the uniformity waveform for each tire comprising a plurality of uniformity measurements of a uniformity parameter for a plurality of measurement points about the tire; and
  one or more computing devices coupled to the measurement machine, the one or more computing devices comprising one or more processors and at least one memory, the memory storing computer-readable instructions that when executed by the one or more processors cause the one or more processors to perform operations, the operations comprising:
    obtaining uniformity measurements of a uniformity parameter for each tire in a set of a plurality of tires, the uniformity measurements for each tire being obtained for a plurality of points about the tire, the uniformity measurements containing a process harmonic associated with the candidate process effect;
    aligning, with one or more computing devices, the uniformity measurements for the set of tires based at least in part on an azimuthal location of a maximum magnitude of the process harmonic on each tire in the set of tires to construct a composite process harmonic sampling;
    estimating, with the one or more computing devices, a magnitude of the process harmonic from the composite process harmonic sampling; and
    modifying tire manufacture based on the magnitude of the process harmonic;
    wherein the uniformity measurements for each tire are obtained for the plurality of points about the tire at a first sampling resolution over an interval of the process harmonic, the composite process harmonic sampling being associated with a second sampling resolution over an interval of the process harmonic, the second sampling resolution being greater than the first sampling resolution.

* * * * *